May 21, 1935. J. C. CARLTON 2,002,446
CLAMPING MECHANISM FOR RADIAL DRILLS
Filed Jan. 9, 1931 5 Sheets-Sheet 2

INVENTOR.
Jack C. Carlton
BY Allen + Allen
ATTORNEYS

May 21, 1935.　　　J. C. CARLTON　　　2,002,446
CLAMPING MECHANISM FOR RADIAL DRILLS
Filed Jan. 9, 1931　　5 Sheets-Sheet 5

INVENTOR.
Jack C. Carlton
BY Allen & Allen
ATTORNEYS.

Patented May 21, 1935

2,002,446

UNITED STATES PATENT OFFICE 2,002,446

CLAMPING MECHANISM FOR RADIAL DRILLS

Jack C. Carlton, Cincinnati, Ohio, assignor to The Carlton Machine Tool Company, Cincinnati, Ohio, a corporation of Ohio Application January 9, 1931, Serial No. 507,673

17 Claims. (Cl. 77—28)

My invention relates to radial tools, and more particularly to methods of clamping and unclamping the outer column that carries the drill arm to the inner column or main standard of the machine in a radial drill. Certain aspects of my invention are applicable to machine tools in general.

In radial drills, the outer column carries the arm, and the arm carries the drill head and the operating parts therefor, as well as the mechanism for moving the arm up and down on the outer column. The outer column is arranged to rotate on the inner column so as to bring the tools over the work, whereupon the outer column is clamped in position during the working operation.

There have been many devices used in the past for clamping the outer column against movement. These devices at first were operated by hand, requiring the operator to walk over to the clamping lever and operate it, but latterly the use of power means for operating the clamp, both by compressed air and by electric motors, have become the practice.

The various types of clamping devices that have been devised have been frictional clamps, for the most part, either of the expanding or contracting type between the inner column and a skirt at the bottom of the outer column. I have illustrated my invention as applied to the contracting type.

My invention relates to a power means for operating the clamp in a radial tool, whereby the power means is entirely out of the way and assists rather than accentuates the balance of the machine. It further relates to operating the clamp by hydraulic means, particularly where driven by a separate electric motor, thus permitting a remote control of the motor from the end of the arm or the tool head, and providing for a rapid action without jar or shock. It further relates to a particular construction of a motor driven hydraulic actuating device for the purpose in view.

One of the particular objects of my invention is to locate the power means for the clamp on that portion of the tool arm which projects in the opposite direction from the tool head, and carries the main driving motor. The swinging around of this portion of the arm does not interfere with the work, and if small and compact does not constitute any interference whatever with the operation of the tool, any more than were it equipped with a hand operated clamp. Any additional weight for the power means will assist in this position in counterbalancing the tool head and arm, and there is much less torque in the necessary connecting shaft between the power means and the clamp, than if the power means were mounted on the top of the outer column. Another way of mounting the power means would be on the collar at the lower end of the outer column, but this results in interference with work clamped on the bed of the machine, when the outer column is swung around.

The use of a hydraulic actuator driven by a motor has many advantages over any other clamp actuator driven by motor with which I am familiar, no matter where mounted on the drill. It would seem at first glance that with an electric motor for operating the clamp, the use of a hydraulic mechanism would merely be an added expense without advantage. However, a number of features indicate the particular value of this mode of operation. In the first place, the electric motor which is used need not be nearly as powerful and heavy as would be required if the motor did the clamping directly, for one reason, because the friction consumed in the drive is much less and the force applied is employed largely in effecting the clamping and unclamping operation. Then, again, it is readily practical to use a reversing motor and reversing hydraulic pump, which makes remote control easy, there being no clutches to throw. The motor can accelerate rapidly, since the hydraulic pump does not throw an immediate load on the motor, and no provision need be made for starting torque. A corollary to this is that the action of the mechanism is much quicker than that of an electric motor drive using gearing and worm tooth transmission. The hydraulic pump can be directly connected, and there is little or no wear in the mechanism. The reaching of the limit of movement, during a period when the motor is supplied with current, will not burn out the motor or fuses, and no particular cut-out or time switches need to be employed, because when the clamp is home, or is entirely open, the continued operation of the motor merely operates the hydraulic pump without the pump doing any work. In other words, the use of the hydraulic mechanism with the motor provides a cushioned stroke apparatus for working the clamp.

As will appear from the following description of the preferred construction of my device, the above objects and advantages are accomplished, and these are, so far as I am advised, entirely new in the particular art involved.

In the following specification, in which reference will be made to the accompanying drawings, I will set forth the construction and operation of an illustrative form of my invention, and in the appended claims will set forth the novelty inherent therein, and inherent in equivalent devices directed to the same end.

In the drawings:—

Figure 7 is a section on the line 7—7 of Figure 6, showing the clamp in unlocked position.

Figure 1:
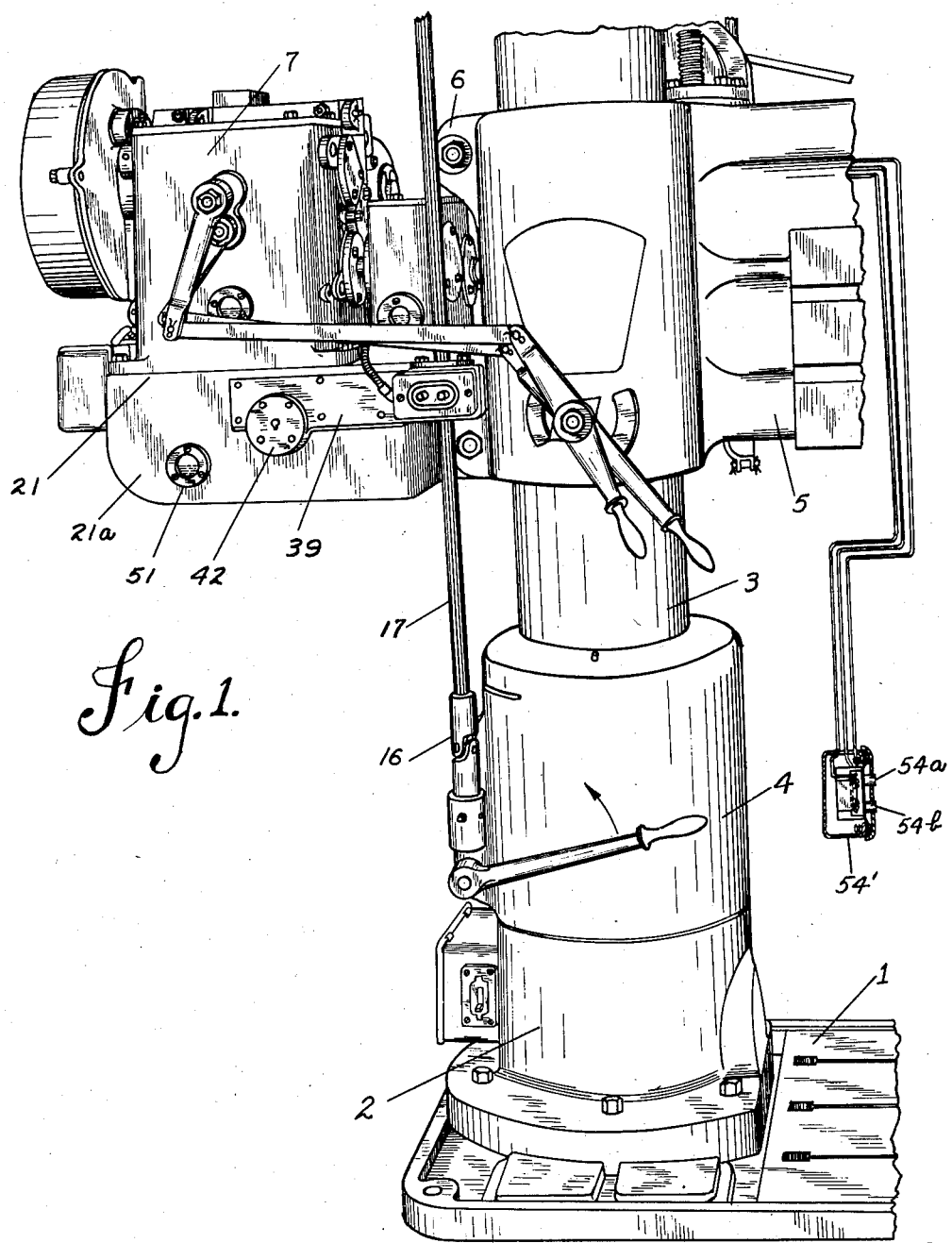
Figure 1 is a perspective view of a portion of a radial drill illustrating my invention.
Figure 2:
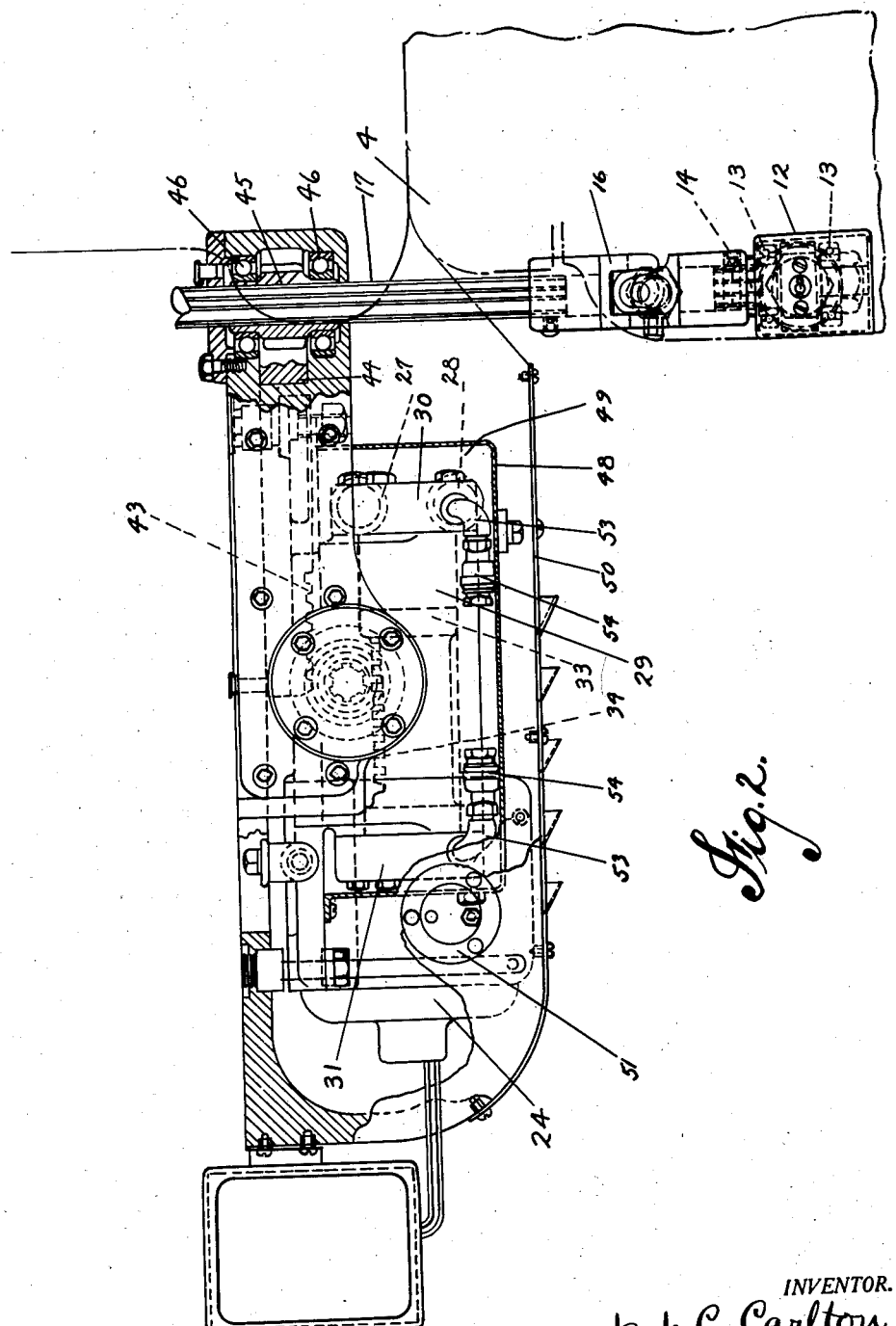
Figure 2 is a side elevation of the power unit for the clamp, with the cover partly broken away.

The drill comprises as its essential parts, a bed 1, an inner column 2, and an outer column 3 having a skirt 4 which surrounds the inner column. The arm 5 carries the usual drill head (not shown), and the rearward projection 6 on which is mounted the motor unit or driving unit 7 for operating the machine proper including the rotation and feeding of the drilling tool.

Figure 4:
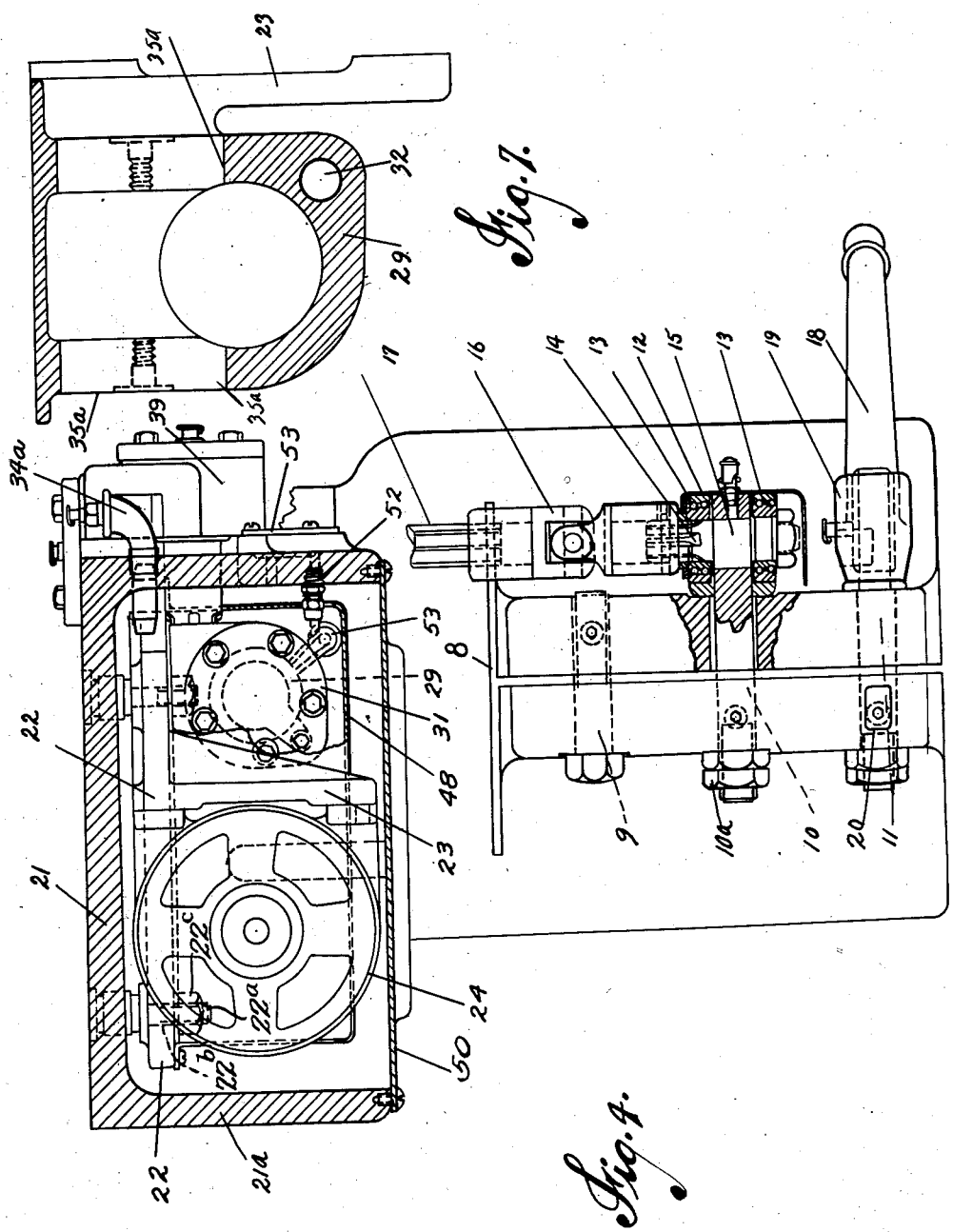
Figure 4 is an end elevation, partly in section, of the power unit showing the clamping element in detail.
Figure 5:
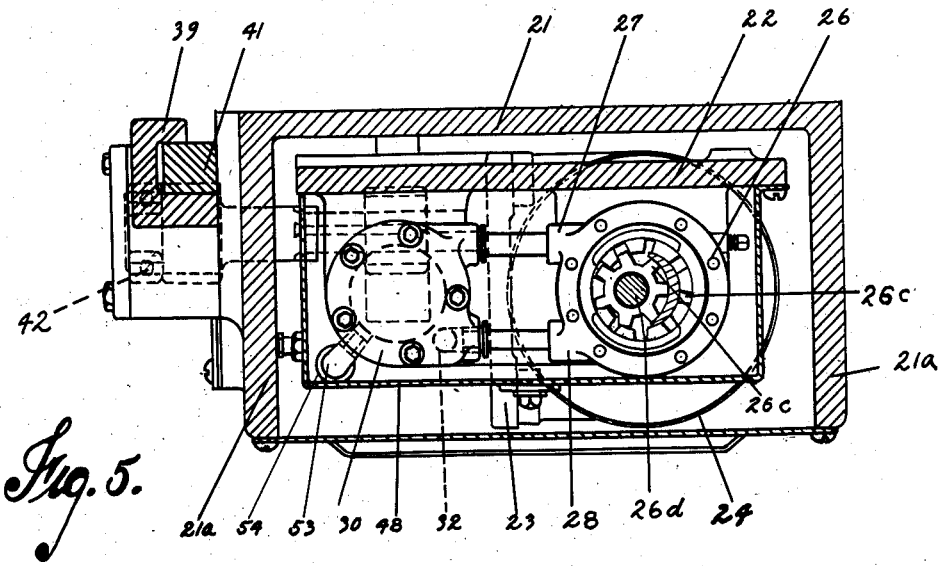
Figure 5 is a sectional view taken through the drill arm showing the power unit at right angles to Figure 2.
Figure 6:
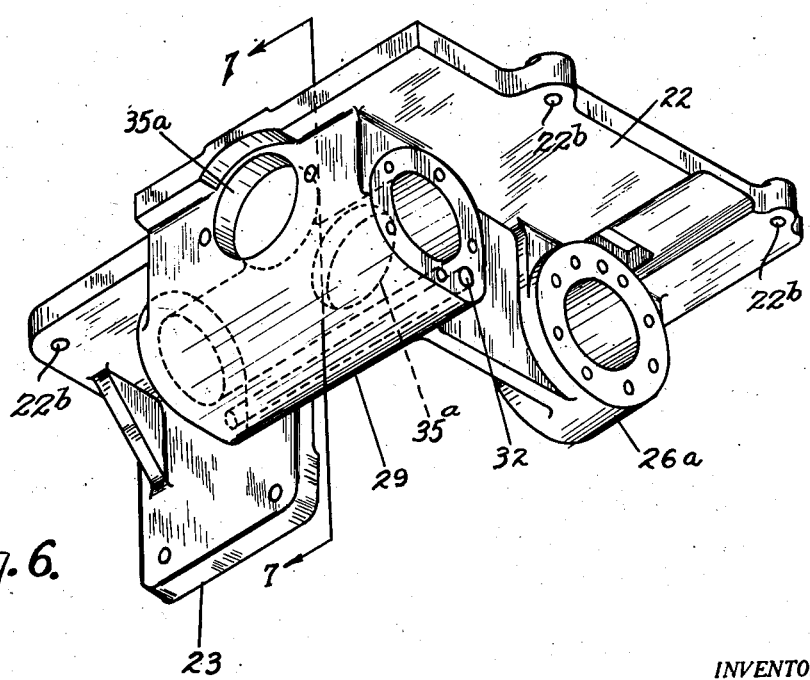
Figure 6 is a perspective of the power unit casting.

Referring to Figure 4, it will be noted that the skirt is split at 8, and the split is traversed by a series of bolts, the bolt 9 being a guide bolt, the bolt 10 being the power unit operated bolt, and the bolt 11 being a hand-operated bolt.

Referring to the bolt 10, it is adjusted in position by means of nuts 10a, and passes through apertures in the split portions of the skirt and enters a housing 12 on the opposite side of the skirt from the nuts. Within this housing are two bearings 13 for a stub shaft 14, which stub shaft includes an eccentric 15 which is engaged in a hole in the bolt 10. By revolving the stub shaft the eccentric 15 is revolved which pulls on the bolt, thereby drawing the parts of the skirt together and clamping the skirt about the inner column. The stub shaft 14 is connected by a universal joint 16 with a splined shaft 17 that extends up along the outer column. The hand-operated lever 18, when actuated, rotates the nut 19 which engages threads on the bolt 11, this bolt being held from rotating by a slot 20. When the eccentric 15 is in clamp-locking position, the forces of the clamp urging release of the clamp cannot force the eccentric around into clamp-releasing position. The eccentric must be positively rotated into releasing position by the device which rotated it into clamp-locking position in order to release the clamp.

The end of the drill arm, ordinarily referred to as the motor end, is formed as a plate or pad 21, on top of which the main drive mechanism is secured, this pad having a depending flange 21a. On the bottom of this plate portion within the flange the power unit for the clamp is mounted. This consists of a triangular or L-shaped casting 22, which provides a mounting plate 23 for the reversible electric motor 24. The motor shaft 25 is connected to a gear pump or other rotary or reversible pump, of which there are many on the market, which has been generally indicated at 26 mounted on a boss 26a of the casting, which boss houses the shaft couplings. This pump has outlet connections 27 and 28, both extending forwardly to a cylinder 29. The one outlet extends to a port in the head 30 of the cylinder, and the other is connected to the head 30, and then communicates with a passageway through the cylinder wall that opens into the head 31 of the cylinder, as indicated at 32.

Figure 3:
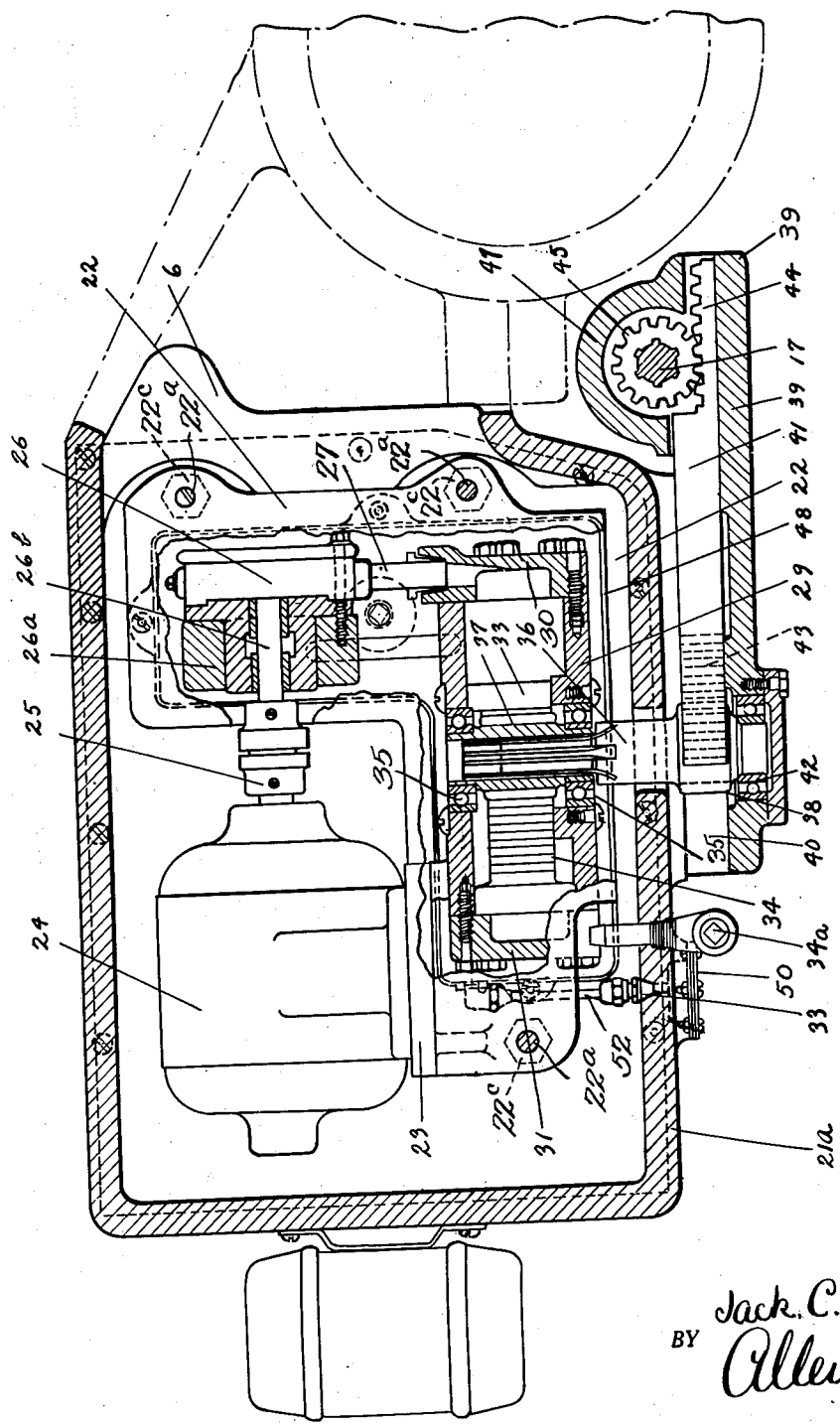
Figure 3 is an underneath plan view, partly in section, of the power unit for the clamp.

The particular method of connecting the outlets 27 and 28 to the opposite ends of the cylinder is unimportant. The cylinder is formed integrally on the remaining portion of the L-shaped casting 22, and has within it a double headed piston 33 with the portion connecting the two heads being formed as a rack 34. Mounted in suitable bearings 35, 35, in the apertures 35a, 35b of the cylinder wall, is a shaft 36 which has mounted thereon within the cylinder a gear 37 that meshes with the rack. The shaft 36 extends out through the flange 21a and is equipped with a gear 38 on its outer end. The flange 21a is formed with a projection 39 which forms a slideway 40 in which is slidably mounted a rack 41. The shaft 36 has a bearing 42 in the projection 39. The pinion 38 on the shaft 36 meshes with teeth 43 on the rack bar 41, and the outer end of the rack bar has teeth 44 which mesh with a pinion 45. This pinion is held in bearings 46 so as to rotate but not slide in a boss 47 formed in the projection 39 of the drill arm. The gear 45 is splined as shown, to the shaft 17. As will be noted by a comparison of Figs. 3 and 4, the piston 33 is at the limit of its stroke in one direction by engagement of its end with the head 31 when the high point of the eccentric 15 is in the line of force exerted by the clamp, or on dead center, and when the piston is at the other limit of its movement against the head 30, the high point of the eccentric is again in said line of force, or on dead center, at the opposite side of its axis of rotation. The clamp is adjusted by the units 10a, so that the clamp is clamped at the moment of arrival of the high point of the eccentric in said line of force, or on dead center, in which relation the clamp remains clamped until the eccentric is again moved by the same agency which effected the clamping.

I have shown as mounted on the casting 22, a triangular box 48 which forms an oil chamber in which the pump and the operating cylinder and its connections are located. I have indicated at 49 the normal level of oil held in the box or receptacle 48. The entire power unit is enclosed in a hood 50, which is nothing but a casing to protect the parts, and may be provided with a sight gauge 51 which communicates through a pipe 52 with the interior of the oil receptacle or box 48. The box 48 will be provided at some convenient point with an aperture for filling it with oil, as through a plug 34a.

In order to assure that the power system will at all times remain filled with oil, I provide in each head of the cylinder for a projecting pipe 53 which extends to a position on the bottom of the receptacle 48, at which point said pipes are equipped with check valves 54, which valves operate to prevent the lubricant from passing out from the pipe 53, and to permit oil to pass into said pipe. As the result of this construction, when the pump is operating, for example, to force the right hand piston head 33 to the left, it will at the same time withdraw oil from the head 31 at the left of the cylinder, and if there is not sufficient oil in the cylinder, the additional oil required to keep the pump system full will be drawn in from the receptacle through the left hand check valve 54. It will be noted from Figs. 2, 3, 5 and 7 that in this exemplification the respective ends of the cylinder are interposed between the pump and the check valves, so that the pump draws liquid first from the end of the cylinder to relieve back pressure against the piston and to aid in reversal of the reciprocating member, and, after back pressure on the piston is relieved, suction from the reservoir through the check valve becomes effective.

As will be readily apparent, once the system is in operation, the only requirement will be to keep the receptacle 48 filled with oil above the level of the check valves 54, and any leakage of oil in the system will simply serve to replenish the reserve in the reservoir 48.

The particular pump which I employ, the operation of which is typical of the type of operation which I desire, but which is simply one of a great many different styles of rotary pumps which can be purchased on the market, has a shaft 26b carried in the boss 26a, and within the enclosed casing 26 is equipped with a pair of gears 26c, one eccentric to the other, the inner gear being held on a stud 26d, and the outer gear being mounted on the shaft 26b.

The entire power unit, including the casting 22, the electric motor 24, the pump 26 and the fluid motor, and their connections with each other, are preferably connected in assembled form and thus secured to the shelf, plate or pad 21 by means of bolts 22a, the upper ends of which are fixed in the plate, shelf or pad, the bolts being located in holes 22b in the casting 22, and nuts 22c being threaded over the lower ends of the bolts for clamping the assembled power unit to the lower face of the plate, shelf or pad 21.

I have illustrated as a portion of Figure 1, an electric switch 54' which, it will be understood, will be located on the drill head or some suitable portion of the arm according to known and practiced methods in previous electrically operated clamps. The switch in this instance is so arranged that the depression of one of the switch buttons will arrange the circuit for operating the motor in one direction, and the depression of the other switch button will arrange the circuit for operating the motor in the other direction, and the springs will throw both buttons and the switch and control parts in the open circuit position. In view of the fact that the pump elements can rotate for several minutes after the clamp is absolutely locked tight without damage to any parts although under considerable load, there is no necessity for any electrical cut-out in my apparatus, and all that the operator needs to do is press his finger on the switch button and hold it there for such period of time as he is sure that the clamp is completely locked, whereupon he releases the button and the switch moves to neutral position. In the same way, when he desires to move the arm, he will press the other switch button and hold it down for the moment that is necessary for the clamp to be opened, whereupon he releases the button and the circuit to the motor is opened. The switch buttons 54a and 54b will be spring resisted.

As already explained, my device operates very rapidly, and there is no jar or shock incident to its operation. There is little or no friction in the drive for the clamp aside from that in the clamp itself, and accordingly a powerful motor is not required. There are no clutches to throw since the motor and pump can operate equally well in either direction, and there is no necessity for making provision for a starting torque on the motor, because the hydraulic pump does not throw an immediate load on the motor, and it can accelerate rapidly. Thus, the clamp operates very quickly, and, as pointed out above, no special fusing, particular cut-outs or time switches need be used, because the operator can let go of the switch in plenty of time to avoid burning out the motor.

The sequence of operations consists of starting the electric motor, building up a pressure by means of the pump, using the pressure to operate a piston, which piston is the sole element that is mechanically connected to the clamp cam thus operating the clamp to fixed locked position, where it remains until the clamp is positively opened. When the clamp is locked, such leakage as is bound to be present in the pump and the hydraulic piston system will permit the electric motor to operate, although under increasing load and at materially reduced speed, resulting in partial stalling of the electric motor.

In attempting to operate a clamp for machine tools by an electric motor mechanically coupled to the clamp operator, it is necessary, in order to get the motor up to running speed, to interpose a motion reduction system, such as a worm feed, for example. The operation of this worm takes time, in the first place; in the second place, there is an immediate load on the motor; and in the third place, it results in jamming the motor instantaneously upon the clamp becoming locked.

In the present invention, while the pump is building up pressure there is little load, and the motor comes to speed practically instantaneously, and there is no positive jamming when the clamp is locked.

In connection with the mounting of the motor, it can be readily observed that in instances where the drill arm itself will clear the work, the power unit will clear the work also, so that there is absolutely no interference with the operation of the drill due to the location of the power unit. Also, the power unit is located in a position where it adds to the stability of the machine rather than to detract from it, as where the motor is mounted on the top of the column.

Referring to the drive itself, it will be noted that the mechanical arrangement is quite simple and strong, very readily accessible for inspection and repair, and in its details quite safe against improper operation. In this connection, the check valve system of replenishing the oil should have particular notice.

While I refer above to a radial drill, it is apparent that my invention is applicable to many radial arm machines such as are used for milling, tapping, boring, etc. Also, there are many types of machine tools where a clamp is operated, and my invention is applicable in many respects to various clamping operations in the machine tool art.

Having thus described my invention, what I claim as new and desire to secure by Letters Patent, is:—

1. Operating means for a clamp for a metal working machine element comprising a reversible electric motor independent of duty in tool actuation, a reversible fluid pump comprising reversible fluid pressure propelling means driven by said electric motor and capable of continued operation after the clamp is absolutely locked tight without damage to any parts, a fluid motor comprising a reversely operated member having operative connection with the clamp, reverse sides of said fluid pressure propelling means and of said reversely operated member being in fluid communication with each other for reversely operating said reversely operated member by reversal of said reversible electric motor, manually operated automatically releasing electric switch means selectively controlling the reverse actuations of said reversible electric motor and the durations of said respective reverse actuations, said electric motor increasing speed with little resistance for effective clamping and unclamping of said clamp upon acquiring speed.

2. Operating means for an eccentric clamp for a metal working machine element comprising a reversible electric motor independent of duty in tool actuation, a reversible fluid pump comprising reversible fluid pressure propelling means driven by said reversible electric motor, and capable of continued operation after the clamp is absolutely locked tight without damage to any parts manually operated automatically releasing switch means controlling the direction and duration of operation of said motor and sequentially of said fluid pressure propelling means, a fluid motor comprising a reversely operated member, reverse sides of said fluid pressure propelling means and of said reversely operated member being in fluid communication with each other for reversely operating said reversely operated member, and connecting means between said reversely operated member and said eccentric clamp for operating the latter in reverse directions, and said electric motor increasing speed with little resistance for effective clamping and unclamping of said eccentric clamp upon acquiring of speed by said electric motor.

3. Operating means for a clamp for a metal working machine element comprising a reversible electric motor independent of duty in tool actuation, a reversible fluid pump comprising fluid pressure propelling means driven in reverse directions by said reversible electric motor and capable of continued operation after the clamp is absolutely locked tight without damage to any parts, a fluid motor comprising a reversely operated member having operative connection with the clamp, reverse sides of said fluid pressure propelling means and of said reversely operated member being in fluid communication with each other for reversely operating said reversely operated member, a fluid reservoir, and check valves fed from the fluid in said fluid reservoir and having fluid communication with the reverse ends of said fluid motor, and manually operated automatically releasing electric switch means selectively controlling the reverse actuations of said reversible electric motor and the durations of said respective reverse actuations, and said electric motor increasing speed with little resistance for effective clamping and unclamping of said clamp upon acquiring speed.

4. A hydraulic unit for a clamp for a metal working machine element comprising a reversible electric motor independent of duty in tool actuation, a reversible fluid pump comprising reversible fluid pressure propelling means driven by said reversible electric motor and capable of continued operation after the clamp is absolutely locked tight without damage to any parts, a fluid motor comprising a reversely operated member having operative connection with the clamp, reverse sides of said fluid pressure propelling means and of said reversely operated member being in fluid communication with each other for reversely operating said reversely operated member, a casing in which said fluid pump and said fluid motor are located, and a fluid reservoir in said casing, the reverse ends of said fluid motor having check valve communication with the fluid in said fluid reservoir, and manually operated automatically releasing electric switch means selectively controlling the reverse actuations of said reversible electric motor and the durations of said respective reverse actuations, and said electric motor increasing speed with little resistance for effective clamping and unclamping of said clamp upon acquiring speed.

5. A hydraulic unit for a clamp for a metal working machine element comprising a reversible hydraulic pump including liquid propelling means selectively actuated to feed fluid in each of reverse directions, a fluid motor comprising a reversely operated member reverse ends of which are in continuous open fluid communication with reverse sides of said liquid propelling means for being operated in reverse directions, connecting means between said reversely operated member and said clamp for operating said clamp in reverse directions for respectively clamping and unclamping said clamp, means limiting the extents of reverse movements of said reversely operated member, and means for adjusting the clamping moment of said clamp with relation to the limit of movement of said reversely operated member in clamping direction.

6. In a metal working machine, the combination of a movable element, a clamp for clamping said movable element, a clamp operating member, a reversible electric motor, a reversible fluid pump operated thereby, a fluid motor including a reversely operated member operated by the fluid from said fluid pump, fluid connections between reverse operative sides of said fluid pump and reverse operative ends of said fluid motor, said fluid connections being such that reversal of said reversible electric motor causes reversal of movement of said reversely operated member for respectively clamping and unclamping said clamp, means limiting the reverse movements of said reversely operated member, and means adjusting the clamping moment of said clamp operating member with relation to the limit of movement of said reversely operated member in clamping direction.

7. In a radial drilling machine, the combination of a work support, a rigid column extending upwardly adjacent thereto, a rotatable column about said rigid column, a clamp for clamping said columns together, a radial drill arm having a bearing about said rotatable column, said drill arm having a shelf at the rear side of said bearing, a driving unit for the machine supported on the top of said shelf, and a clamp operating unit for clamping and unclamping said clamp supported under said shelf at the rear of said bearing, said clamp operating unit including a separate reversible electric motor, a reversible fluid pump and a reversible fluid motor, said reversible fluid pump including reversible fluid pressure propelling means with which said separate reversible electric motor has drive connection, and said reversible fluid motor including a reversely operated member, and fluid connections between reverse operative sides of said reversible fluid pressure propelling means and reverse operative sides of said reversely operated member, said fluid connections being such that reversal of said separate reversible electric motor causes reversal of movement of said reversely operated member, and said reversely operated member having drive connection with said clamp for clamping and unclamping said clamp, and manually operated automatically releasing electric switch means selectively controlling the reverse actuations of said separate reversible electric motor and the durations of said respective reverse actuations.

8. In a radial drilling machine, the combination of a work support, a rigid column extending upwardly adjacent thereto, a rotatable column about said rigid column, a clamp for clamping said columns together, a radial drill arm having a bearing about said rotatable column, said drill arm having a shelf at the rear side of said bearing, a driving unit for the machine supported on the top of said shelf, and a clamp operating unit for clamping and unclamping said clamp supported under said shelf at the rear side of said bearing, said clamp operating unit including a separate reversible electric motor, a reversible fluid pump and a reversible fluid motor, said reversible fluid pump including reversible fluid pressure propelling means with which said separate reversible electric motor has drive connection, and said reversible fluid motor including a reversely operated member, fluid connections between reverse operative sides of said reversible fluid pressure propelling means and reverse operative sides of said reversely operated member, said fluid connections being such that reversal of said separate reversible electric motor causes reversal of movement of said reversely operated member, a casing in which said clamp operating unit is contained, and a fluid reservoir in said casing, the reverse ends of said fluid motor having inwardly opening check valve communication with the fluid in said fluid reservoir, and said reversely operated member having drive connection with said clamp for clamping and unclamping said clamp, and manually operated automatically releasing electric translating means selectively controlling the reverse actuations of said separate reversible electric motor and the durations of said respective reverse actuations.

9. In a radial drilling machine, the combination of a work support, a rigid column extending upwardly adjacent thereto, a rotatable column about said rigid column, a clamp for clamping said columns together, a radial drill arm having a bearing about said rotatable column, said drill arm extended as a shelf at the rear side of said bearing, a driving unit for the machine supported on top of said shelf, and means for operating said clamp including a separate electric motor, a fluid pump and a fluid motor operatively connected as a unit for selectively operating said fluid motor and mounted under said shelf at the rear of said bearing and located substantially within the horizontal planes extended of said drill arm, whereby substantially the full vertical clearance between said drill arm and said work support is maintained between said included parts of said means for operating said clamp and said work support upon movement of said shelf directly above said work support, said fluid motor having operative connection with said clamp for clamping and unclamping said clamp.

10. In a radial drilling machine, the combination of a work support, a rigid column extending upwardly adjacent thereto, a rotatable column about said rigid column, a clamp for clamping said columns together, a radial drill arm having a bearing about said rotatable column, said drill arm extended as a shelf at the rear side of said bearing, a driving unit for the machine supported on the top of said shelf, power operating means for operating said clamp, including a separate electric motor, a fluid pump and a fluid motor operatively connected as a unit for selectively operating said fluid motor, and means securing said power operating unit under said shelf at the rear of said bearing substantially within the horizontal planes extended of said drill arm, whereby substantially the full vertical clearance between said drill arm and said work support is maintained between said power operating means and said work support upon movement of said shelf directly above said work support, said fluid motor having operative connection with said clamp for clamping and unclamping said clamp.

11. In a radial drilling machine, the combination of a work support, a rigid column extending upwardly adjacent thereto, a rotatable column about said rigid column, a clamp for clamping said columns together, a radial drill arm having a bearing about said rotatable column, said drill arm extended as a shelf at the rear side of said bearing, a driving unit for the machine supported on the top of said shelf, a casing under said shelf, and power operating means for operating said clamp including a separate electric motor, a fluid pump and a fluid motor operatively connected as a unit for selectively operating said fluid motor and located in said casing, whereby slubstantially the full vertical clearance between said drill arm and said work support is maintained between said casing and said work support upon movement of said shelf and said casing directly above said work support, said fluid motor having operative connection with said clamp for clamping and unclamping said clamp.

12. In clamping means of the character described, the combination of a clamp, a reversible actuating part for clamping and unclamping said clamp, and actuating means for said actuating part comprising a reversible electric motor, a reversible hydraulic pump having a hydraulic operating member with which said motor has operative connection for operating the same in reverse directions in accordance with the directions of rotation of the rotor of said reversible electric motor, a hydraulic motor comprising an operated member, said hydraulic pump having opposite ports at opposite sides of said hydraulic operating member, said hydraulic motor having opposite ports at the opposite sides of said operated member respectively communicating with said opposite ports of said hydraulic pump, a liquid reservoir, and automatic outwardly closing and inwardly opening check valves operated automatically by suction and arranged in constant communication with the liquid in said liquid reservoir and respectively having liquid communication with said hydraulic motor at the opposite sides of its said operated member, said last-named communications being independent of said communications between said ports, whereby the suction through each of said first-named opposite ports is through each of said second-named ports and the suction through said check valves is through both said opposite ports, whereby to relieve back pressure on said operated member at reversals thereof.

13. In clamping means of the character described, the combination of a clamp, a reversible actuating part for clamping and unclamping said clamp, and actuating means for said actuating part comprising a reversible electric motor, a reversible hydraulic pump having a hydraulic operating member with which the reversely operating rotor of said motor has operative connection, a hydraulic motor comprising an operated member, said hydraulic pump having opposite ports at opposite sides of said hydraulic operating member, said hydraulic motor having ports at the opposite sides of said operated member respectively communicating with said opposite ports of said hydraulic pump, a liquid reservoir, and automatic outwardly closing an inwardly opening check valves automatically actuated by suction and arranged in constant communication with the liquid in said reservoir and respectively having liquid communications with said pump operatively delayed with relation to the communications between said ports with said pump whereby the suction to said pump is sequentially through said ports and said check valves for relieving back pressure on said operated member at reversals thereof.

14. In a radial drilling machine, the combination of a base, a rotatable column extending thereabove, a clamp for clamping said rotatable column in fixed relation to said base, a drill arm having a bearing about said column and provided with a shelf at the rear of said bearing, and a clamp operating unit secured under said shelf substantially within the horizontal projection of said drill arm, said clamp operating unit including a support and a separate reversible electric motor, a reversible hydraulic pump and a reversible hydraulic motor interconnected and mounted on said support, the interconnections between said electric motor, said pump and said hydraulic motor including a drive connection between said reversible electric motor and said reversible hydraulic pump journaled on said support, said pump and said hydraulic motor each provided with opposite ports, and liquid passages between said ports of said pump and of said hydraulic motor respectively, and arranged for reverse operations of said reversible hydraulic motor by reverse operations of said reversible electric motor, and clamp operating means having operative connections with said reversible hydraulic motor and said clamp for translating the opposite movements in said reversible hydraulic motor into clamping and unclamping movements of said clamp.

15. In a radial drilling machine, the combination of a base, a rotatable column extending thereabove, a clamp for clamping said rotatable column in fixed relation to said base, a drill arm having a bearing about said column and provided with a shelf at the rear of said bearing, and a clamp operating unit secured under said shelf substantially within the horizontal projection of said drill arm, said clamp operating unit including a support and a separate reversible electric motor, a reversible hydraulic pump and a reversible hydraulic motor interconnected and mounted on said support, a liquid reservoir under said reversible hydraulic motor, inwardly opening check valves communicating with the respective sides of said reversible hydraulic motor and having suction connection with the liquid in said reservoir, the interconnections between said electric motor, said pump and said hydraulic motor including a drive connection between said reversible electric motor and said reversible hydraulic pump journaled on said support, said pump and said hydraulic motor each provided with opposite ports, and liquid passages between said ports of said pump and of said hydraulic motor respectively, and arranged for reverse operations of said reversible hydraulic motor by reverse operations of said reversible electric motor, and clamp operating means having operative connections with said reversible hydraulic motor and said clamp for translating the opposite movements in said reversible hydraulic motor into clamping and unclamping movements of said clamp.

16. In clamping means for a metal working machine element, a clamp operating unit comprising a support including a cylinder, a pump supporting ring and a motor supporting flange having a motor supporting face, the axes of said cylinder and of said ring being parallel with said supporting face, a reversible electric motor secured to said supporting face, a reversible hydraulic pump secured to said ring and provided with opposite ports, a shaft for said pump journaled in said ring and having operative connection with said motor, heads for the respective ends of said cylinder and a piston in said cylinder to form a reversible hydraulic motor, and fluid passages between said opposite ports and the opposite ends of said cylinder respectively arranged for reversely reciprocating said piston by reversals of said reversible electric motor, and clamp operating means geared to said piston for clamping and unclamping movements of the clamp respectively by opposite movements of said piston.

17. In clamping means for a metal working machine element, a clamp operating unit comprising a support including a cylinder, a pump supporting ring and a motor supporting flange having a motor supporting face, the axes of said cylinder and of said ring being parallel with said supporting face, a reversible electric motor secured to said supporting face, a reversible hydraulic pump secured to said ring and provided with opposite ports, a shaft for said pump journaled in said ring and having operative connection with said motor, heads for the respective ends of said cylinder and a piston in said cylinder to form a reversible hydraulic motor, fluid passages between said opposite ports and the opposite ends of said cylinder respectively, a liquid reservoir under said cylinder, and inwardly opening check valves communicating with the respective ends of said cylinder and having suction connection with the liquid in said reservoir, arranged for reversely reciprocating said piston by reversals of said reversible electric motor, and clamp operating means geared to said piston for clamping and unclamping movements of the clamp respectively by opposite movements of said piston.

JACK C. CARLTON.